Feb. 11, 1930.  E. F. W. ALEXANDERSON  1,747,041
SPEED INDICATING SYSTEM
Filed Oct. 27, 1928

Inventor:
Ernst F. W. Alexanderson,
by Charles E. Tullar
His Attorney.

Patented Feb. 11, 1930

1,747,041

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

SPEED-INDICATING SYSTEM

Application filed October 27, 1928. Serial No. 315,568.

My invention relates to a method and means for indicating the relative speed of moving vehicles and it has for one of its objects to provide means for use particularly upon railway vehicles, or locomotives, whereby the operator, or engineer, may be continuously informed of the relative speed of his vehicle with respect to that of the vehicle which he may be following upon the track.

In accordance with my present invention I provide means upon each vehicle whereby alternating current having a frequency which is variable dependently upon the speed of the vehicle is produced, together with means whereby current having this variable frequency may be transmitted from a leading vehicle to a following vehicle and combined on the following vehicle with current having a frequency dependent upon the speed of the following vehicle in a detector of well known form. In the output circuit of this detector on the following vehicle will then be produced current having a frequency which is equal to the difference in the frequencies of the combined currents, or which is proportional to the difference in the speeds of the two vehicles. This current may then be supplied to a suitable indicating device such as a loud speaking telephone, or other frequency responsive indicating device, whereby the operator may be continuously informed of the relative speed of the two vehicles.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1 and 2 illustrate an embodiment of my invention.

Figure 1:
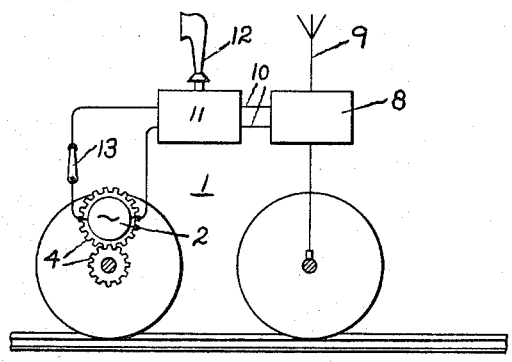
Figure 2:
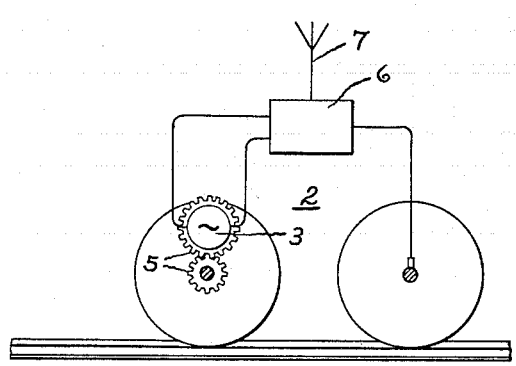

Referring to the drawing I have represented in Fig. 1 a vehicle 1 which may be the following train of two or more trains operating upon a railway system. Fig. 2 represents the vehicle 2 which is immediately ahead of the vehicle represented by Fig. 1 upon the track. These vehicles are represented as being provided with alternating current generators 2 and 3 respectively, these generators being of any suitable form such, for example, as an alternating current dynamo electric machine, the armature of which is geared to the axle of the locomotive through reduction gears 4 and 5 respectively, such that each generator produces in its output circuit an alternating potential having a frequency which is proportional to the speed at which the vehicle is traveling upon the track. The vehicle 2 carries a radio frequency transmitter 6 of any usual construction such, for example, as those used for broadcasting purposes, and an antenna 7 by means of which a radio frequency current may be radiated into space. The audio frequency or modulating circuit of the transmitter 6 is arranged to be supplied with current which is produced by the generator 3, whereby the radio frequency current which is radiated from the antenna 7 is modulated in accordance with the alternating current potential produced by the generator 3.

The vehicle 1 carries a radio receiver 8 having an antenna 9. This receiver is likewise of any usual construction and is arranged to respond to radio frequency current having the frequency which is produced and radiated by the transmitter 6, causing demodulation thereof to reproduce in its output circuit 10 current having the frequency of the alternating potential which is produced by the generator 3 on the vehicle 2 and which is caused to modulate the radiated wave. The potential of the circuit 10 is supplied to a second detector 11 which may be of any usual construction such, for example, as the ordinary electron discharge device having an input circuit including a grid which is biased upon the curved portion of the anode current grid voltage characteristic. Potential having the frequency which is produced by the generator 2 and also a potential having the frequency of the circuit 10 which corresponds to the frequency of the potential produced by the generator 3 are supplied to the input circuit of the detector 11. In the output circuit of the detector is connected any suitable indicating device such as the ordinary loud speaking telephone 12 whereby a sound or note is produced having a pitch which is dependent upon the difference in the frequencies of the potentials which are applied to the input circuit of the detector. This pitch must therefore correspond to the difference in the speeds of the vehicles.

Thus it will be seen that in utilizing the invention the loud speaking telephone 12 will be mounted in the operator's cab of the vehicle, and accordingly will provide a continuous indication of the relative speed at which the vehicle is proceeding with respect to that of the vehicle immediately previous upon the track. If the operator observes a change in the pitch of the note which he receives from the loud speaker 11, notwithstanding, that his own vehicle is proceeding at a constant speed, he will be informed that the leading vehicle has either increased or decreased its speed. He will then diminish the speed of his own vehicle, and if the note received from the loud speaker approaches the former pitch he will be informed that the leading vehicle has lessened its speed, and that he, for safety, must proceed at the lower speed. If, on the other hand, upon lessening the speed of his own vehicle, the operator observes that the note received from the loud speaker becomes of higher pitch, he will then be informed that the leading vehicle has increased its speed, and that he may then increase the speed of his vehicle with safety.

In order that the operator of the vehicle 1 may ascertain the absolute speed of the vehicle which he is following upon the track, means comprising a switch 13, is provided for interrupting the supply of current from the generator 2 to the detector 11. When this switch is in its open circuit position the device 12 will respond only to current produced by the generator 3 on the leading vehicle and will thereby furnish an indication of the absolute speed of that vehicle. Similarly it will appear that if either of the vehicles stops the device 12 will furnish an indication of the absolute speed of the other vehicle.

While I conventionally represent one means whereby my invention may be carried into effect, it will of course be understood that I am not to be limited thereto since many modifications in the system described and in the instrumentalities employed may be made without departing from the spirit and scope of my invention, as set forth in the appended claims.

What I claim as new and desire to secure by Letters Patent of the United States, is:

1. The method of indicating the relative speed of moving vehicles which comprises the steps of producing on each vehicle an alternating current having a frequency proportional to the speed of the vehicle, transmitting the current produced on one vehicle to another vehicle, producing on the other vehicle an alternating current having a frequency equal to the difference in the frequencies of the first mentioned currents and producing an indication in accordance with the frequency of the said last current.

2. The method of indicating the relative speed of moving vehicles which comprises the steps of producing on each vehicle an alternating current having a frequency proportional to the speed of the vehicle and in producing an indication dependent upon the relation between the frequencies of the currents produced.

3. In combination, a pair of moving vehicles, means on each of said vehicles for producing alternating current having a frequency which is variable dependently upon the speed of the vehicle on which it is produced, means for supplying said current produced on one vehicle to the other vehicle and indicating means on the other vehicle responsive to the difference in the frequencies of the currents produced on said vehicles whereby the difference in the speeds of said vehicles may be determined.

4. In combination, a track, a pair of moving vehicles on said track, means on each vehicle for producing alternating current having a frequency which is dependent upon the speed of the vehicle on which it is produced, a detector on one of said vehicles having an output circuit, means for supplying to said detector the currents produced on both vehicles whereby current is produced in the output circuit of said detector having a frequency equal to the difference between the frequencies of the first mentioned currents and means for producing an audible indication dependent upon the frequency of the current in the output circuit whereby the relative speeds of the vehicles may be determined.

5. In combination, a track, a pair of moving vehicles on said track, means on each vehicle for producing alternating current having a frequency which is proportional to the speed of the vehicle on which it is produced, radio transmitting means on one of said vehicles for radiating a carrier wave modulated with said current having a frequency which is proportional to the speed of the vehicle which carries the transmitting means, radio receiving means on the other vehicle for reproducing current having said last mentioned frequency and means for producing an indication responsive to the difference between said last mentioned frequency and the frequency of said current which is produced on said other vehicle.

6. In combination, a track, a pair of moving vehicles on said track, an alternating current dynamo-electric machine having an output circuit on each vehicle, means for driving each dynamo-electric machine at a speed proportional to the speed of the vehicle whereby alternating potential is produced in each output circuit having a frequency proportional to the speed of the vehicle on which the dynamo-electric machine is carried, means for transmitting said alternating potential from one of said vehicles to the other and indicating means on the other vehicle responsive to the difference in the frequencies of said alternating potentials whereby the difference in the speeds of said vehicles may be determined.

7. In combination, a pair of moving vehicles, means on each of said vehicles for producing alternating current having a frequency which is variable dependently upon the speed of the vehicle on which it is produced, a detector having an output circuit, means for supplying current having the frequency current produced on each of said vehicles to said detector whereby current having a frequency equal to the difference in said frequencies is produced in the output circuit, indicating means responsive to said frequency and means for interrupting the supply of current having the frequency of current produced on one vehicle to said detector whereby said indicating means responds to the frequency of current produced on the other vehicle.

In witness whereof, I have hereunto set my hand this 26th day of October, 1928.

ERNST F. W. ALEXANDERSON.